(12) United States Patent
Kim et al.

(10) Patent No.: US 9,723,905 B2
(45) Date of Patent: Aug. 8, 2017

(54) DIGITAL DEVICE EMITTING A SCENT WITH AN IMAGE AND METHOD FOR CONTROLLING THE SAME

(71) Applicant: LG Electronics Inc., Seoul (KR)

(72) Inventors: Jihwan Kim, Seoul (KR); Doyoung Lee, Seoul (KR); Sinae Chun, Seoul (KR); Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/832,687

(22) Filed: Aug. 21, 2015

(65) Prior Publication Data

US 2015/0351518 A1 Dec. 10, 2015

Related U.S. Application Data

(63) Continuation of application No. 14/178,848, filed on Feb. 12, 2014, now Pat. No. 9,144,815.

(30) Foreign Application Priority Data

Sep. 26, 2013 (KR) .......................... 10-2013-0114501

(51) Int. Cl.
  B05B 12/14 (2006.01)
  A45D 34/00 (2006.01)
  (Continued)

(52) U.S. Cl.
  CPC ............ A45D 34/00 (2013.01); B05B 12/124 (2013.01); G06F 1/1684 (2013.01); G06F 3/011 (2013.01);
  (Continued)

(58) Field of Classification Search
  CPC ..... B05B 12/124; B05B 12/12; B05B 12/122; B05B 12/00
  See application file for complete search history.

(56) References Cited

U.S. PATENT DOCUMENTS

2003/0206834 A1* 11/2003 Chiao .................... A61L 9/014
                                                          422/124
2009/0179866 A1*  7/2009 Agevik .................. G06F 3/011
                                                          345/173

(Continued)

FOREIGN PATENT DOCUMENTS

EP         2 031 481 A1      3/2009
JP         2005-352282 A    12/2005
(Continued)

*Primary Examiner* — Lisa Landis
(74) *Attorney, Agent, or Firm* — Birch, Stewart, Kolasch & Birch, LLP

(57) ABSTRACT

A digital device including a scent emitting unit and a method for controlling the same are disclosed. The digital device includes a display unit for displaying a first image including a first object having a first scent property and a second object having a second scent property, a sensor unit for sensing a distance from a specific body part of a user, a scent emitting unit, and a processor. The processor controls the scent emitting unit to emit any one of a first scent, a second scent or a mixture of the first scent and the second scent according to the distance from the specific body part of the user, and a mixture ratio of the first scent to the second scent in the mixture is changed according to a predetermined condition.

17 Claims, 10 Drawing Sheets

(51) Int. Cl.
  *B05B 12/12*   (2006.01)
  *G06F 3/041*   (2006.01)
  *G06F 1/16*    (2006.01)
  *G06F 3/01*    (2006.01)

(52) U.S. Cl.
  CPC ...... *G06F 3/0416* (2013.01); *A45D 2034/002* (2013.01)

(56) References Cited

U.S. PATENT DOCUMENTS

| | | | |
|---|---|---|---|
| 2009/0265670 A1* | 10/2009 | Kim | G06F 3/04883 715/863 |
| 2010/0187332 A1 | 7/2010 | Ushijima | |
| 2011/0111704 A1 | 5/2011 | Son et al. | |
| 2011/0148926 A1 | 6/2011 | Koo et al. | |
| 2013/0271407 A1* | 10/2013 | Yoon | G06F 3/0488 345/173 |

FOREIGN PATENT DOCUMENTS

| | | |
|---|---|---|
| JP | 2008-270916 A | 11/2008 |
| KR | 10-2009-0057878 A | 6/2009 |
| WO | WO 2011/074793 A2 | 6/2011 |

\* cited by examiner

DIGITAL DEVICE EMITTING A SCENT WITH AN IMAGE AND METHOD FOR CONTROLLING THE SAME

CROSS REFERENCE TO RELATED APPLICATIONS

This application is a Continuation of co-pending U.S. application Ser. No. 14/178,848, filed on Feb. 12, 2014, which claims the benefit of Korean Patent Application No. 10-2013-0114501, filed on Sep. 26, 2013, which is hereby incorporated by reference as if fully set forth herein.

BACKGROUND OF THE INVENTION

Field of the Invention

The present invention relates to a digital device and a method for controlling the same, and more particularly, to a method of controlling a scent emitting unit for emitting a scent, the strength of which is changed according to a distance between a digital device including the scent emitting unit and a specific body part of a user, and a digital device therefor.

Discussion of the Related Art

With development of techniques related to an electronic display, various types of electronic displays have been released. In addition, digital devices such as smart phones and smart TVs using various types of electronic displays have also been released. For example, a digital device including a scent emitting unit has been released.

A digital device including a scent emitting unit emits a scent corresponding to an image displayed on a display unit. However, a conventional digital device including a scent emitting unit only emits a scent corresponding to an image displayed on a display unit but cannot control a scent according to user's intention.

SUMMARY OF THE INVENTION

Accordingly, the present invention is directed to a digital device and a method for controlling the same that substantially obviate one or more problems due to limitations and disadvantages of the related art.

An object of the present invention is to provide a digital device for emitting a scent, the strength of which is changed according to a distance from a specific body part of a user, and a method for controlling the same.

Another object of the present invention is to provide a digital device for emitting a mixed scent, in which a ratio of a scent of an object adjacent to a specific body part of a user is larger at a specific distance, and a method for controlling the same.

Another object of the present invention is to provide a digital device for controlling a scent emitting direction, strength and angle according to external wind.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital device includes a display unit for displaying a first image including a first object having a first scent property and a second object having a second scent property, a sensor unit for sensing a distance from a specific body part of a user, a scent emitting unit, and a processor. The processor controls the scent emitting unit to emit any one of a first scent, a second scent or a mixture of the first scent and the second scent according to the distance from the specific body part of the user, and a mixing ratio of the first scent to the second scent in the mixture is changed according to a predetermined condition.

In another aspect of the present invention, a method for controlling a digital device includes displaying a first image including a first object having a first scent property and a second object having a second scent property, sensing a distance from a specific body part of a user, and emitting any one of a first scent, a second scent or a mixture of the first scent and the second scent according to the distance from the specific body part of the user. A mixing ratio of the first scent to the second scent in the mixture is changed according to a predetermined condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, a mobile terminal according to the present invention will be described in detail with reference to the accompanying drawings. The terms "module" and "unit" attached to describe the names of components are used herein to aid in the understanding of the components and thus they should not be considered as having specific meanings or roles. Accordingly, the terms "module" and "unit" may be used interchangeably.

A digital device described in the preset specification may be a digital device capable of displaying an image, such as a personal computer (PC), a personal digital assistant (PDA), a laptop, a tablet PC or a smart phone. In the present specification, the digital device may include a touchscreen.

Figure 1:
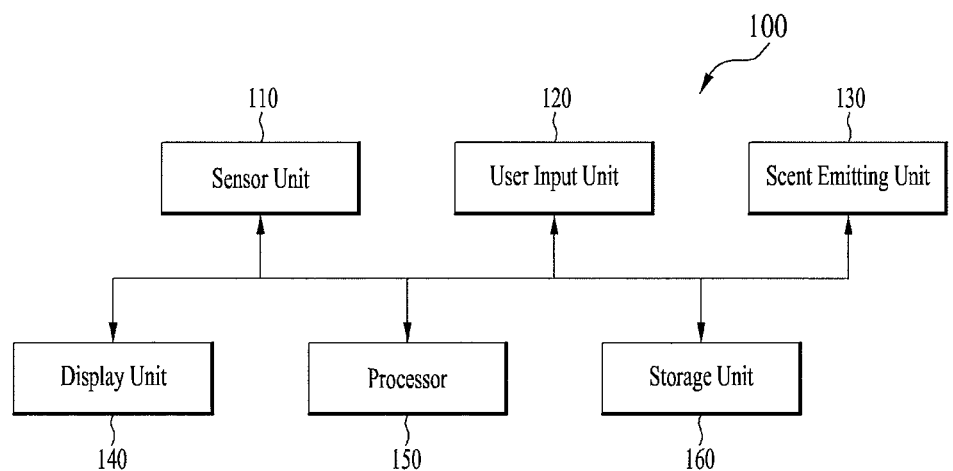
FIG. 1 is a block diagram showing the configuration of a digital device according to one embodiment of the present invention.

FIG. 1 is a block diagram showing the configuration of a digital device according to one embodiment of the present invention. FIG. 1 is only exemplary and some component modules may be deleted or new component modules may be added as necessary.

Referring to FIG. 1, the digital device 100 according to one embodiment includes a sensor unit 110, a user input unit 120, a scent emitting unit 130, a display unit 140, a processor 150 and a storage unit 160.

The sensor unit 110 senses a surrounding environment of the digital device 100 using at least one sensor included in the digital device 100 and delivers the sensed result to the processor 150 in the form of a signal.

The sensor unit 110 includes at least one sensor. Here, the sensor unit 110 may include a distance sensor, an image sensor, a gravity sensor, a geomagnetic sensor, a motion sensor, a gyroscopic sensor, an acceleration sensor, an infrared sensor, an inclination sensor, a brightness sensor, an altitude sensor, an olfactory sensor, a temperature sensor, a depth sensor, an RGB sensor, a pressure sensor, a bending sensor, an audio sensor, a video sensor, a global positioning system (GPS) sensor, a touch sensor, a grip sensor, etc. The sensor unit 110 may be distributed over the entire screen of the display unit 140.

The sensor unit 110 senses a distance from a user. More specifically, the sensor unit 110 may sense a distance from the sensor unit 110 to a specific body part of a user. The specific body part of the user may mean a user's face or nose. For example, the sensor unit 110 may detect the location of a user's nose via an image acquired via at least one sensor or detect a user's face via an image acquired via at least one sensor and detect the location of the nose of the user based on the detected user's face. Alternatively, the processor 150 may analyze an image acquired via the sensor of the sensor unit 110 to detect the location of the user's face or nose. The storage unit 160 may store an algorithm or program necessary to sense the specific body part of the user and/or the distance from the sensor unit 110 to the specific body part of the user.

The user input unit 120 receives user input for controlling the operation of the digital device 100 and sends an input signal corresponding to the received user input to the processor 150. When the display unit 140 includes a touch-screen, the touchscreen may serve as the user input unit 120.

The display unit 140 displays (outputs) information processed by the digital device 100.

The display unit 140 may include at least one of a liquid crystal display (LCD), a thin film transistor liquid crystal display (TFT LCD), an organic light emitting diode (OLED), a flexible display and a three-dimensional (3D) display.

The display unit 140 displays an image having at least one object. The object may mean a part having a predetermined shape in the image and may correspond to a person, a thing, an animal, plants, etc. The image may include a still image, a moving image or slide images in which a plurality of still images is switched in the form of a slide show.

At least some of objects included in an image displayed on the display unit 140 may have unique scent properties. The storage unit 160 may store or temporarily store image files to be displayed on the display unit 140, and mapping data of objects included in an image of the image files and scent properties.

The scent emitting unit 130 emits a scent to the outside of the digital device 100 under control of the processor 150. The kind of the scent is not limited and includes aroma and bad smell. Although not shown in FIG. 1, the digital device 100 may include a material storage for storing a raw material configuring an emitted scent and a neutralization material for neutralizing a specific scent.

The processor 150 controls the sensor unit 110, the user input unit 120, the scent emitting unit 130, the display unit 140 and the storage unit 160.

The storage unit 160 may store a variety of digital data such as audio, images and applications. The storage unit 160 may mean various digital data storage spaces such as a flash memory, a random access memory (RAM) or a solid state drive (SSD).

Although not shown in FIG. 1, the digital device 100 may include an audio output unit and/or a power unit.

The audio output unit (not shown) includes an audio output means such as a speaker or an earphone. The audio output unit may output sound based on a control command of the processor 150 or content executed by the processor 150. At this time, the audio output unit may be selectively provided on the digital device 100.

The power unit (not shown) is connected to a battery included in the digital device 100 or an external power source and may supply power to the digital device 100.

The digital device 100 shown in FIG. 1 is exemplary and blocks shown in FIG. 1 correspond to logically divided elements of the device. Accordingly, the elements of the device may be mounted in a single chip or a plurality of chips according to device design.

Figure 2:
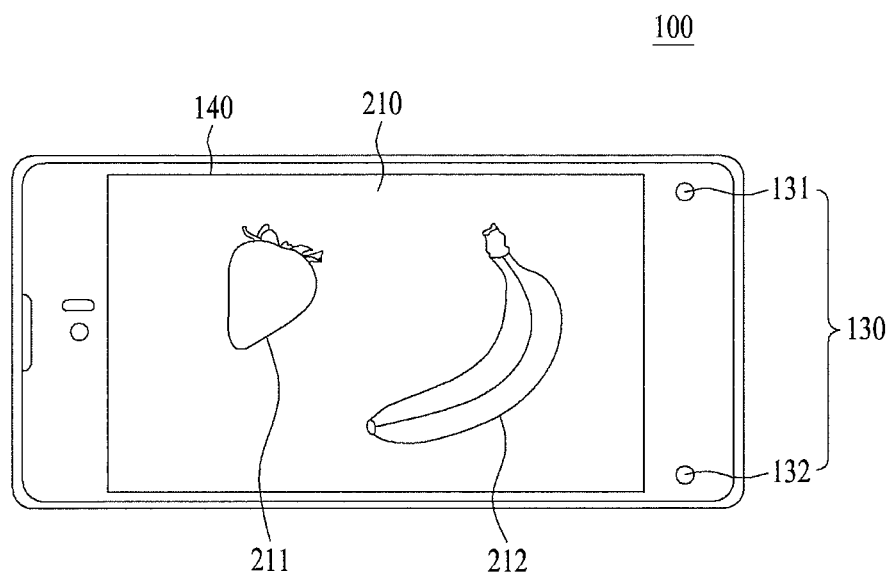
FIG. 2 is a diagram showing an example of a first image displayed on a display unit of a digital device according to one embodiment of the present invention.

FIG. 2 is a diagram showing an example of a first image displayed on a display unit of a digital device according to one embodiment of the present invention.

The display unit 140 of the digital device 100 displays the first image 210. The first image 210 includes at least one object. In this case, assume that a first object 211 and a second object 212 are included in the first image 210. The first object 211 has a first scent property and the second object 212 has a second scent property.

The scent emitting unit 130 externally emits a scent mapped to an object of an image displayed on the display unit 140 under control of the processor 150. Referring to FIG. 2, the scent emitting unit 130 emits a first scent, a second scent or a mixture of the first scent and the second scent. In the mixture, a mixture ratio of the first scent to the second scent may be changed according to a predetermined condition.

A plurality of scent emitting units 130 may be included. Although a first scent emitting unit 131 and a second scent emitting unit 132 are provided on an upper case of the digital device 100, the number and locations of scent emitting units may be changed according to embodiment.

Figure 3:
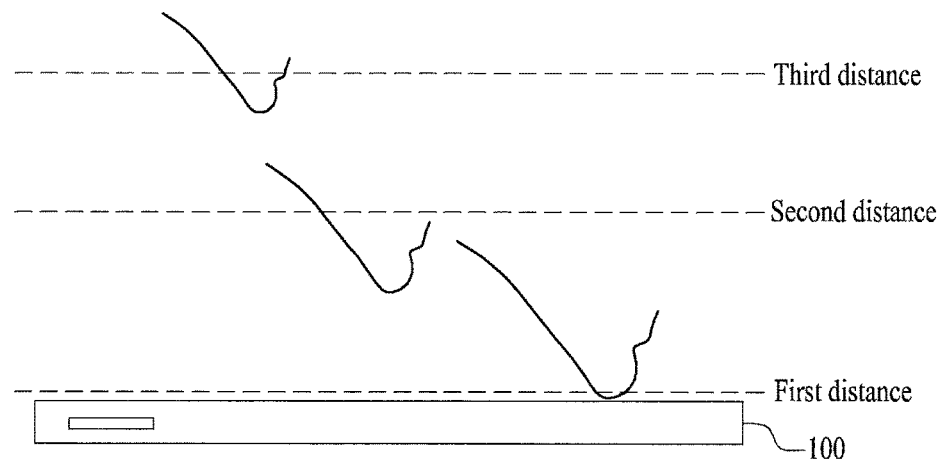
FIG. 3 is a diagram illustrating a relationship between a distance from a specific body part of a user and an emitted scent in a digital device according to one embodiment of the present invention.

FIG. 3 is a diagram illustrating a relationship between a distance from a specific body part of a user and an emitted scent in a digital device according to one embodiment of the present invention.

The processor 150 controls the scent emitting unit 130 to emit any one of the first scent, the second scent or the mixture of the first scent and the second scent according to the distance from the specific body part of the user to the sensor unit 110. Assume that the specific body part of the user is a nose.

The processor 150 may control the scent emitting unit 130 to emit a scent of a specific object when the specific body part of the user corresponds to the specific object and control the scent emitting unit 130 not to emit a scent or to emit the mixture of the first scent and the second scent when the specific body part of the user does not correspond to the specific object, in the case in which the distance from the specific body part of the user as the sensed result of the sensor unit 110 is equal to or less than a first distance. In the latter case, in the mixture, a rate of the scent of the object adjacent (closer) to the specific body part of the user may be larger in the mixture. For example, if the first object 211 is closer to the specific body part of the user than the second object 212, a rate of the first scent of the first object 211 is larger than a rate of the second scent of the second object 212 in the mixture. The first distance is a predetermined distance adjacent to the display unit 140.

The distance from the specific body part of the user as the sensed result of the sensor unit 110 being equal to or less than the first distance includes the case in which the specific body part of the user contacts the display unit 140. For example, when the display unit 140 includes a touchscreen, the specific body part of the user touching the touchscreen corresponds to the distance from the specific body part of the user being equal to or less than the first distance.

The processor 150 controls the scent emitting unit 130 to emit the mixture of the first scent and the second scent when the distance from the sensor unit 110 to the specific body part of the user as the sensed result of the sensor unit 110 is greater than the first distance and is equal to or less than a second distance. The second distance is greater than the first distance. The processor 150 controls the scent emitting unit 130 to emit the mixture of the first scent and the second scent, in which a rate of the scent of an object adjacent (closer) to the specific body part of the user is larger in the mixture, when the distance from the specific body part of the user as the sensed result of the sensor unit 110 is greater than the first distance and is equal to or less than the second distance. For example, if the first object 211 is closer to the specific body part of the user than the second object 212, a rate of the first scent of the first object 211 is larger than a rate of the second scent of the second object 212 in the mixture.

If the scent emitting unit 130 emits the mixture in which the mixture ratio of the first scent to the second scent is changed, the ratio of the first scent to the second scent may be controlled according to proximity of the specific body part of the user.

The processor 150 controls the scent emitting unit 130 to emit the mixture of the first scent and the second scent when the distance from the specific body part of the user as the sensed result of the sensor unit 110 is greater than the second distance and is equal to or less than a third distance. The third distance is greater than the second distance. The processor 150 controls the scent emitting unit 130 to emit the mixture of the first scent and the second scent, in which the ratio of the first scent to the second scent is 1:1, when the distance from the specific body part of the user as the sensed result of the sensor unit 110 is greater than the second distance and is equal to or less than the third distance.

The processor 150 may control the scent emitting unit 130 to stop scent emission when the distance from the specific body part of the user as the sensed result of the sensor unit 110 exceeds the third distance. This is because, when the user is distant from the digital device 100, the user is regarded as having no desiring to smell a scent. In this case, the processor 150 may control the scent emitting unit 130 to emit the first scent, the second scent or the mixture of the first scent and the second scent according to specific user input received via the user input unit 120, in order to enable the user to smell a desired scent only if desired when the user is distant from the digital device 100. Even when the distance from the specific body part of the user is equal to or less than the third distance, the digital device 100 may be designed to enable the scent emitting unit 130 to emit the scent only when specific user input is received via the user input unit 120.

According to embodiment, the processor 150 may control the scent emitting unit 130 such that the strength of the emitted scent is changed according to the distance from the specific body part of the user sensed by the sensor unit 110. The strength of the scent may mean the concentration of a material configuring the scent and/or the spray pressure of the scent. For example, the processor 150 may control the scent emitting unit 130 such that the strength of the emitted scent is increased, that is, the concentration of the material configuring the scent or the spray pressure of the scent is increased, as the distance from the specific body part of the user sensed by the sensor unit 110 is increased.

The first distance, the second distance, the third distance and the difference between two adjacent distances may be changed according to embodiment.

Hereinafter, the scent emitted from the scent emitting unit 130 according to the distance from the specific body part of the user will be described with reference to FIGS. 4 to 11.

Figure 4:
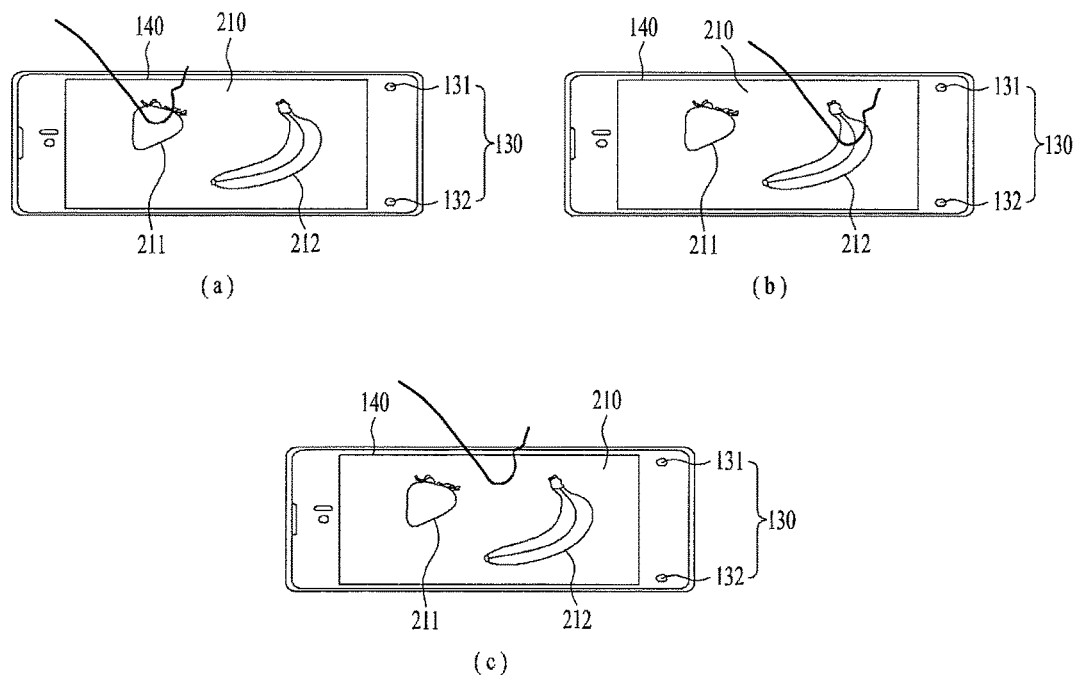
FIG. 4 is a diagram illustrating a scent emitted from a scent emitting unit if a distance from a specific body part of a user is equal to or less than a first distance in a digital device according to one embodiment of the present invention.

FIG. 4 is a diagram illustrating a scent emitted from a scent emitting unit when a distance from a specific body part of a user is equal to or less than a first distance in a digital device according to one embodiment of the present invention.

The display unit 140 of the digital device 100 displays a first image 210 having a first object 211 having a first scent property and a second object 212 having a second scent property.

The processor 150 controls the scent emitting unit 130 to emit the first scent when the specific body part of the user corresponds to the first object 211 (FIG. 4(a)) and controls the scent emitting unit 130 to emit the second scent when the specific body part of the user corresponds to the second object 212 (FIG. 4(b)), in the case in which the distance from the specific body part of the user as the sensed result of the sensor unit 110 is equal to or less than the first distance.

The specific body part of the user corresponding to the specific object may mean that the specific body part of the user vertically overlaps an area occupied by the specific object of the image displayed on the display unit 140. For example, the processor 150 may analyze the image acquired by the sensor included in the sensor unit 110 to confirm the area occupied by the specific body part of the user within the image, determine whether the area occupied by the specific body part overlap the area occupied by the specific object in the image displayed on the display unit 140, and determine whether the specific body part of the user corresponds to the specific object.

According to the embodiment, when the specific body part of the user corresponds to two or more objects, the processor 150 may determine only an object overlapping the specific body part of the user by a predetermined degree or more as the object corresponding to the specific body part of the user.

The distance from the specific body part of the user as the sensed result of the sensor unit 110 being equal to or less than the first distance includes the case in which the specific body part of the user contacts the display unit 140.

If the display unit 140 includes a touchscreen, the processor 150 controls the scent emitting unit 130 to emit the first scent of the first object 211 corresponding to the touch area of the touchscreen (FIG. 4(a)) when touch input for touching the first object 211 is received via the touchscreen and controls the scent emitting unit 130 to emit the second scent of the second object 212 corresponding to the touch area of the touchscreen (FIG. 4(b)) when touch input for touching the second object 212 is received via the touchscreen.

The processor 150 may control the scent emitting unit 130 to emit the scent of the object corresponding to the touch area of the touchscreen regardless of the distance from the specific body part of the user, when touch input is received via the touchscreen. Accordingly, the processor 150 controls the scent emitting unit 130 to emit the scent of the object corresponding to the touch area of the touchscreen regardless of whether the distance from the specific body part of the user to the sensor unit 110 is equal to or less than the first distance. In this case, the processor 150 may disable the distance sensing function of the sensor unit 110 for sensing the distance from the specific body part of the user.

The processor 150 controls the scent emitting unit 130 not to emit the scent or to emit the mixture of the first scent and the second scent (FIG. 4(c)) when the specific body part of the user does not correspond to the specific object, in the case in which the distance from the specific body part of the user as the sensed result of the sensor unit 110 is equal to or less than the first distance.

The specific body part of the user doing not correspond to the specific object may mean that the specific body part of the user and the area occupied by the specific object in the image displayed on the display unit 140 do not vertically overlap or that the specific body part of the user and the area occupied by the specific object in the image displayed on the display unit 140 overlap by less than a predetermined degree.

When the scent emitting unit 130 emits the mixture, a rate of the scent of the object adjacent to the specific body part of the user in the mixture is larger than a rate of each scent of the rest of objects in the mixture. For example, when the specific body part of the user is closer to the first object 211 than the second object 212, a rate of the first scent in the mixture may be larger than a rate of the second scent in the mixture and, when the specific body part of the user is closer to the second object 212 than the second object 212, a rate of the second scent in the mixture may be larger than a rate of the first scent in the mixture. For example, the processor 150 may analyze the image acquired by the sensor included in the sensor unit 110 to confirm the location of the specific body part of the user in the image, compare the location of the specific body part with the location of the specific object in the image displayed on the display unit 140, and determine an object closer to the specific body part of the user between the objects 211 and 212 of the first image 210.

If the display unit 140 includes a touchscreen, the processor 150 may control the scent emitting unit 130 not to emit the scent or to emit the mixture of the first scent or the second scent when touch input in an area other than the first object 211 and the second object 212 in the first image 210 is received via the touchscreen (FIG. 4(c)). If the scent emitting unit 130 emits the mixture, the ratio of the first scent to the second scent in the mixture may be 1:1 or a rate of the scent of the object adjacent to the touch area of the touchscreen in the mixture may be larger than a rate of each scent of the rest of objects.

When the distance from the specific body part of the user is equal to or less than the first distance, the user may be regarded as having desiring to smell the scent corresponding to the object adjacent to the user's nose. According to the present embodiment, since the user simply approaches an object to be smelled in natural fashion, it is possible to increase user convenience.

Figure 5:
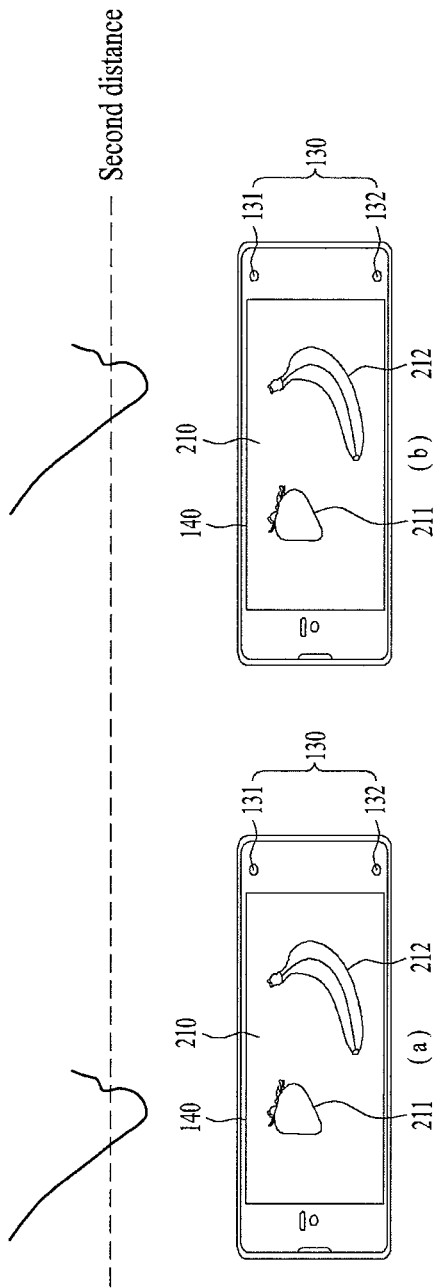
FIG. 5 is a diagram illustrating a scent emitted from a scent emitting unit if a distance from a specific body part of a user is equal to or less than a second distance in a digital device according to one embodiment of the present invention.

FIG. 5 is a diagram illustrating a scent emitted from a scent emitting unit when a distance from a specific body part of a user is equal to or less than a second distance in a digital device according to one embodiment of the present invention. In FIG. 5, assume that the distance from the specific body part of the user exceeds the first distance.

The display unit 140 of the digital device 100 displays the first image 210 including the first object 211 having the first scent property and the second object 212 having the second scent property.

The processor 150 controls the scent emitting unit 130 to emit the mixture of the first scent and the second scent when the distance from the specific body part of the user as the sensed result of the sensor unit 110 is equal to or less than the second distance. In this case, the processor 150 controls the scent emitting unit 130 to emit the mixture, in which a rate of the scent of the object adjacent to the specific body part of the user in the mixture is larger than a rate of each scent of the rest of objects in the mixture. The example of the method of determining the object adjacent to the specific body part of the user is similar to the description of FIG. 4 and thus will be omitted herein.

For example, the processor 150 controls the scent emitting unit 130 to emit the mixture in which a rate of the first scent in the mixture is larger when the first object 211 of the first image 210 is adjacent to the specific body part of the user than a rate of the second scent in the mixture (FIG. 5(a))

and controls the scent emitting unit 130 to emit the mixture of scent in which a rate of the second scent in the mixture is larger when the second object 212 of the first image 210 is adjacent to the specific body part of the user than a rate of the first scent in the mixture (FIG. 5(*b*)), in the case in which the distance from the specific body part of the user as the sensed result of the sensor unit 110 is equal to or less than the second distance.

If the distance from the specific body part of the user is equal to or less than the second distance, the user may be regarded as having desiring to smell the mixture of the first scent and the second scent of the objects included in the displayed image and, more particularly, more richly smelling the scent of the object adjacent to the user's nose, rather than smelling only the scent of a specific object. According to the present embodiment, since the user simply approaches an object to be smelled in natural fashion, it is possible to increase user convenience.

Figure 6:
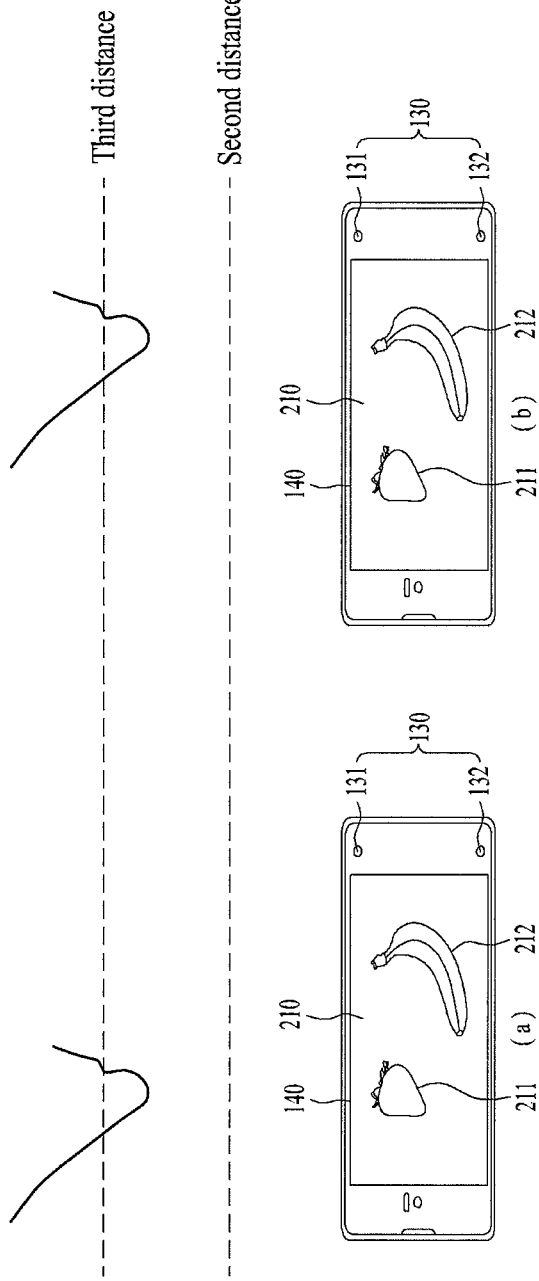
FIG. 6 is a diagram illustrating a scent emitted from a scent emitting unit if a distance from a specific body part of a user is equal to or less than a third distance in a digital device according to one embodiment of the present invention.

FIG. 6 is a diagram illustrating a scent emitted from a scent emitting unit when a distance from a specific body part of a user is equal to or less than a third distance in a digital device according to one embodiment of the present invention. In FIG. 6, assume that the distance from the specific body part of the user exceeds the second distance.

The display unit 140 of the digital device 100 displays the first image 210 including the first object 211 having the first scent property and the second object 212 having the second scent property.

The processor 150 controls the scent emitting unit 130 to emit the mixture of the first scent and the second scent when the distance from the specific body part of the user as the sensed result of the sensor unit 110 is equal to or less than the third distance. In this case, the processor 150 controls the scent emitting unit 130 to emit the mixture, in which the ratio of the first scent to the second scent is 1:1.

For example, the processor 150 controls the scent emitting unit 130 to emit the mixture in which the ratio of the first scent to the second scent is 1:1, regardless of which of the first object 211 and the second object of the first image 210 is adjacent to the specific body part of the user, when the distance from the specific body part of the user as the sensed result of the sensor unit 110 is equal to or less than the third distance (FIGS. 6(*a*) and 6(*b*)).

Alternatively, the processor 150 may control the scent emitting unit 130 to emit the mixture in which the ratio of the first scent is larger when the first object 211 of the first image 210 is adjacent to the specific body part of the user (FIG. 6(*a*)) and control the scent emitting unit 130 to emit the mixture in which the ratio of the second scent is larger when the second object 212 of the first image 210 is adjacent to the specific body part of the user (FIG. 6(*b*)), in the case in which the distance from the specific body part of the user as the sensed result of the sensor unit 110 is equal to or less than the third distance, similarly to the case in which the distance from the specific body part of the user is equal to or less than the second distance.

If the distance from the specific body part of the user is equal to or less than the third distance, the user may be regarded as having desiring to smell the mixture of the first scent and the second scent of the objects included in the displayed image, rather than smelling only the scent of a specific object. According to the present embodiment, since the user simply approaches an object to be smelled in natural fashion, it is possible to increase user convenience.

Figure 7:
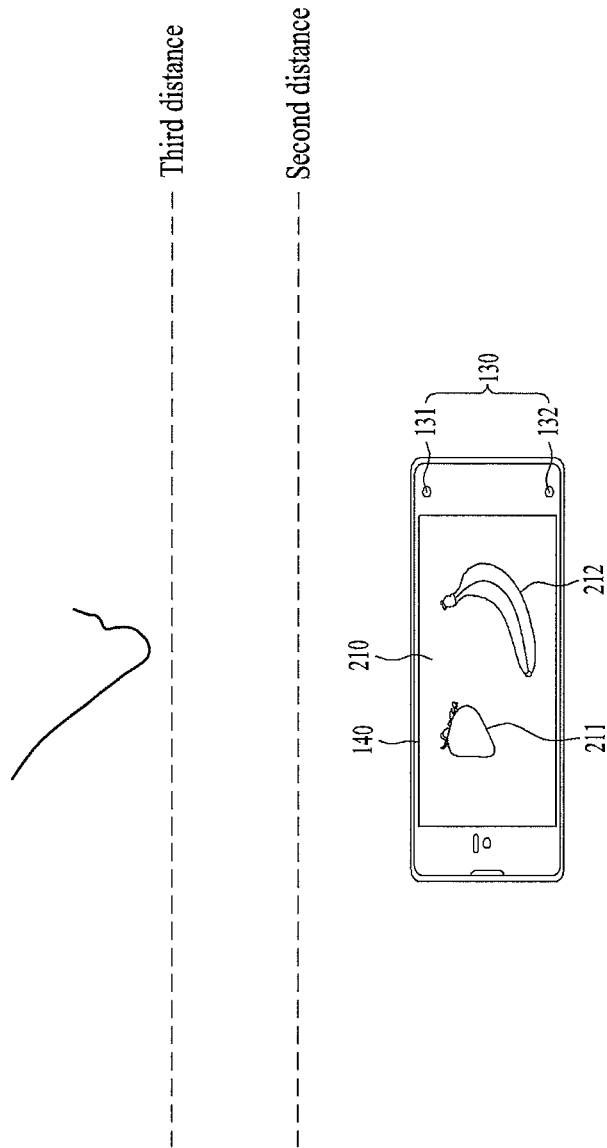
FIGS. 7 to 9 are diagrams illustrating a scent emitted from a scent emitting unit when a distance from a specific body part of a user exceeds a third distance in a digital device according to one embodiment of the present invention.
Figure 8:
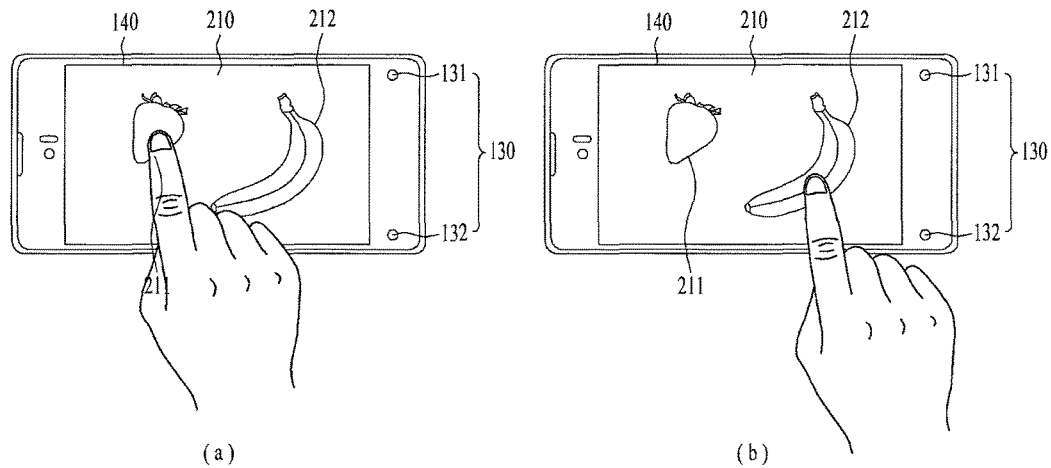
Figure 9:
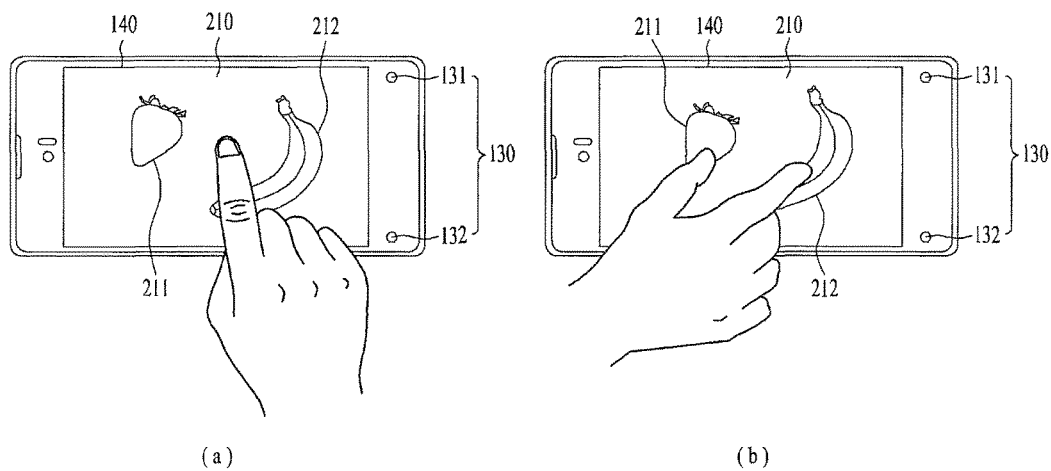

FIGS. 7 to 9 are diagrams illustrating a scent emitted from a scent emitting unit when a distance from a specific body part of a user exceeds a third distance in a digital device according to one embodiment of the present invention.

The display unit 140 of the digital device 100 displays the first image 210 including the first object 211 having the first scent property and the second object 212 having the second scent property.

Referring to FIG. 7, the processor 150 controls the scent emitting unit 130 to stop scent emission if the distance from the specific body part of the user as the sensed result of the sensor unit 110 exceeds the third distance. This is because, when the user is distant from the digital device 100, the user is regarded as having no desiring to smell a scent.

When the distance from the specific body part of the user exceeds the third distance, the processor 150 may control the scent emitting unit 130 to emit the first scent, the second scent or the mixture of the first scent and the second scent according to specific user input received via the user input unit 120, in order to enable the user to smell a desired scent only if desired when the user is distant from the digital device 100. This will be described in detail with reference to FIGS. 8 and 9.

Referring to FIG. 8, the processor 150 may control the scent emitting unit 130 to emit the first scent of the first object 211 corresponding to the touch area of the touchscreen when touch input for touching the first object 211 is received via the touchscreen included in the display unit 140 (FIG. 8(*a*)) and control the scent emitting unit 130 to emit the second scent of the second object 212 corresponding to the touch area of the touchscreen when touch input for touching the second object 212 is received via the touchscreen included in the display unit 140 (FIG. 8(*b*)). In this case, the processor 150 may control the distance sensing function of the sensor unit 110 for sensing the distance from the specific body part of the user.

In addition, referring to FIG. 9(*a*), the processor 150 may control the scent emitting unit 130 not to emit a scent or to emit the mixture of the first scent and the second scent when touch input in an area other than the first object 211 and the second object 212 of the first image 210 is received via the touchscreen included in the display unit 140. If the scent emitting unit 130 emits the mixture of the first scent and the second scent, the ratio of the first scent to the second scent may be 1:1 or a rate of the scent of the object adjacent to the touch area of the touchscreen in the mixture may be larger than a rate of each scent of the rest of objects.

Referring to FIG. 9(*b*), the processor 150 may control the scent emitting unit 130 to emit the mixture of the first scent and the second scent when touch input for touching both the first object 211 and the second object 212 of the first image 210 is received via the touchscreen included in the display unit 140. In this case, the ratio of the first scent to the second scent may be 1:1 in the mixture.

When the distance from the specific body part of the user as the sensed result of the sensing unit 110 exceeds the third distance, a specific graphical user interface (GUI) may be displayed on the display unit 141 and the scent may be emitted from the scent emitting unit 130 according to user input received via the GUI. This will be described with reference to FIG. 10.

Figure 10:
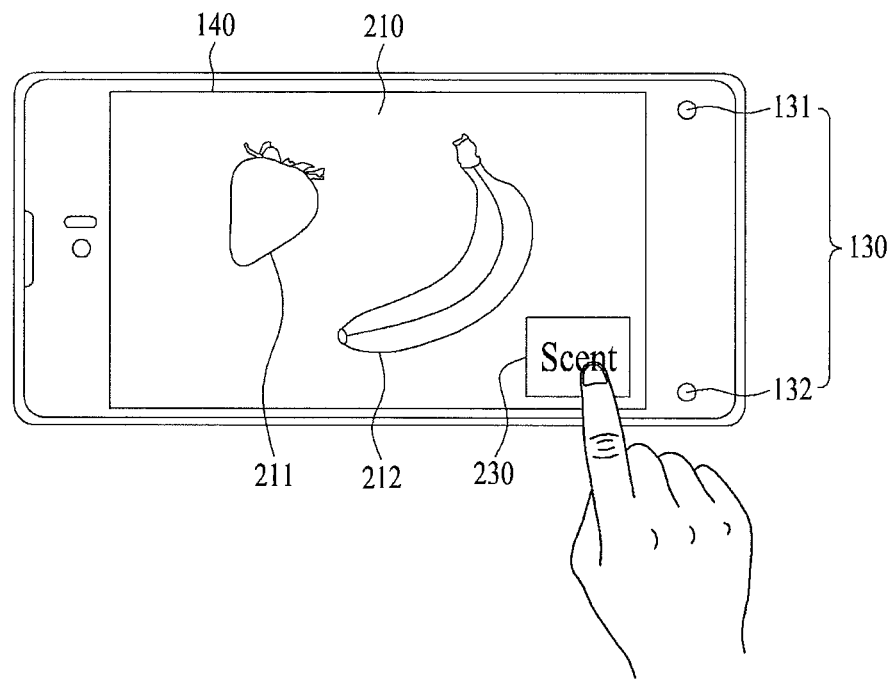
FIG. 10 is a diagram showing an example of a graphical user interface (GUI) displayed on a display unit when a distance from a specific body part of a user exceeds a third distance in a digital device according to one embodiment of the present invention.

FIG. 10 is a diagram showing an example of a graphical user interface (GUI) displayed on a display unit when a distance from a specific body part of a user exceeds a third distance in a digital device according to one embodiment of the present invention.

The display unit 140 of the digital device 100 displays the first image 210 having the first object 211 having the first scent property and the second object 212 having the second scent property.

The processor 150 controls the scent emitting unit 130 to stop scent emission when the distance from the specific body part of the user as the sensed result of the sensor unit 110 exceeds the third distance.

The processor 150 controls the display unit 140 to display the GUI 230 for receiving user input if the distance from the sensor unit 110 to the specific body part of the user exceeds the third distance. The GUI 230 may be overlaid on the first image 210. The processor 150 may control the scent emitting unit 130 to emit the mixture of the first scent and the second scent when touch input for touching the GUI 230 is received. In this case, the ratio of the first scent to the second scent may be 1:1 in the mixture.

Alternatively, although not shown in FIG. 10, the processor 150 may control the display unit 140 to display a first GUI corresponding to the first scent, a second GUI corresponding to the second scent and a third GUI corresponding to the mixture of the first scent and the second scent when the distance from the specific body part of the user exceeds the third distance. In this case, the processor 150 may control the scent emitting unit 130 to emit the first scent when touch input for touching the first GUI is received, control the scent emitting unit 130 to emit the second scent when touch input for touching the second GUI is received and control the scent emitting unit 130 to emit the third scent when touch input for touching the third GUI is received.

Figure 11:
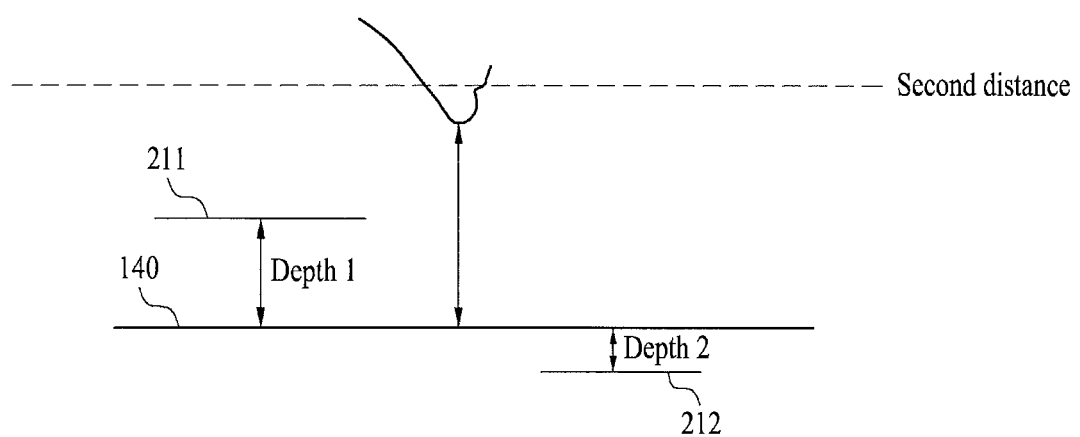
FIG. 11 is a diagram illustrating a relationship between a distance from a specific body part of a user and an emitted scent when a digital device according to one embodiment of the present invention outputs a three-dimensional (3D) image.

FIG. 11 is a diagram illustrating a relationship between a distance from a specific body part of a user and an emitted scent when a digital device according to one embodiment of the present invention outputs a three-dimensional (3D) image.

The display unit 140 of the digital device 100 displays a first image 210 having the first object 211 having the first scent property and the second object 212 having the second scent property.

At least one of the first object 211 and the second object 212 has a depth perceived by the user. In FIG. 11, the first object 211 has a first depth to appear to protrude from the display unit 140 toward the user and the second object 212 has a second depth to appear to be located behind the display unit 140 toward the inside of the digital device 100. For example, the first depth of the first object 211 may have a positive value and the second depth of the second object may have a negative value. Since the depths of the objects of the first image 210 are only perceived by the user, the distance from the specific body part of the user means the distance between the sensor unit 110 and the specific body part of the user regardless of the depths of the objects.

The processor 150 controls the scent emitting unit 130 to emit the mixture of the first scent and the second scent when the distance from the specific body part of the user as the sensed result of the sensor unit 110 is equal to or less than the second distance. In this case, the processor 150 controls the scent emitting unit 130 to emit the mixture in which a rate of the scent of the object adjacent to the specific body part of the user in the mixture is larger than a rate of each scent of the rest objects in the mixture.

The processor 150 may determine the object adjacent to the specific body part of the user using the distance from the specific body part of the user and the depths of the objects. For example, the processor 150 may analyze the image of the user acquired by the sensor included in the sensor unit 110 to determine an object horizontally adjacent to the specific body part of the user between the objects 211 and 212 of the first image 210 and compare the distance from the specific body part of the user and the depths of the objects 211 and 212 of the first image 210 to determine an object vertically adjacent to the specific body part of the user between the objects 211 and 212 of the first image 210. The processor 150 may determine the object, a rate of the scent of which is larger than a rate of each scent of the rest of objects in the mixture, based on the result of determining the object horizontally adjacent to the specific body part of the user and the result of determining the object vertically adjacent to the specific body part of the user.

Although the case in which the distance from the specific body part of the user as the sensed result of the sensor unit 110 is greater than the first distance and is equal to or less than the second distance is described in FIG. 11, the description of FIG. 11 is similarly applicable to the case in which the scent emitting unit 130 emits the mixture of the first scent and the second scent when the distance from the specific body part of the user is equal to or less than the first distance or the third distance.

According to the present invention, if the kind or component of the scent emitted from the scent emitting unit 130 is changed, a neutralization material may be emitted so as to prevent the scent, the kind or component of which is changed, from being contaminated due to the previous scent. This will be described with reference to FIGS. 12 to 15.

Figure 12:
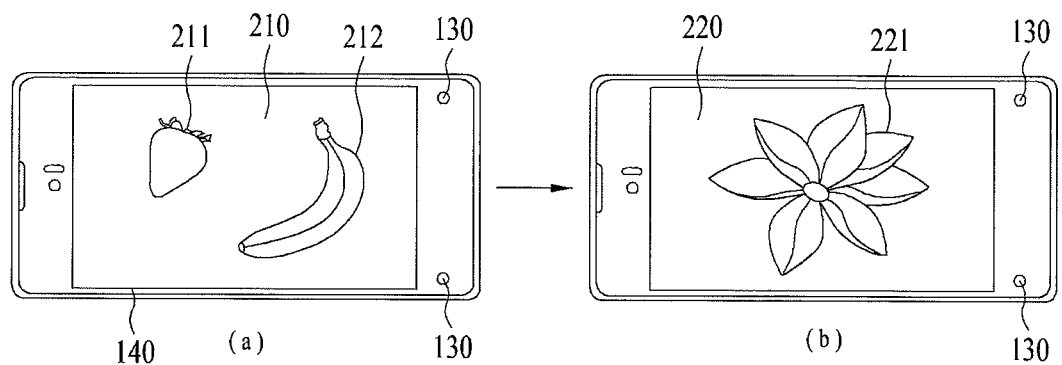
FIG. 12 is a diagram showing a neutralization material emitted from a scent emitting unit when an image displayed on a display unit is switched from a first image to a second image in a digital device according to one embodiment of the present invention.

FIG. 12 is a diagram showing a neutralization material emitted from a scent emitting unit when an image displayed on a display unit is switched from a first image to a second image in a digital device according to one embodiment of the present invention.

The display unit 140 of the digital device 100 displays the first image 210 having the first object 211 having the first scent property and the second object 212 having the second scent property (FIG. 12(a)). The processor 150 controls the scent emitting unit 130 to emit the first scent, the second scent or the mixture of the first scent and the second scent as described above with reference to FIGS. 3 to 11.

The processor 150 may control the display unit 140 to display a second image 220 instead of the first image 210 according to user input, a predetermined condition or playback of a moving image file (FIG. 12(b)). The second image 220 includes a third object and the third object may have a third scent property.

The processor 150 controls the scent emitting unit 130 to stop emission of the scent (the first scent, the second scent or the mixture of the first scent and the second scent) emitted while displaying the first image 210 on the display unit 140 and to emit the neutralization material for neutralizing the scent. For example, the processor 150 may control the scent emitting unit 130 to emit the neutralization material just before the first image 210 is changed to the second image 220, while the first image 210 is changed to the second image 220 or before the second scent is emitted when the second image 220 includes the third object 211 having the third scent property.

For example, if the scent emitted while the first image 210 is displayed on the display unit 140 is the first scent, the neutralization material may be a material which reacts with the material forming the first scent to suppress the first scent or air wind for blowing the first scent from the digital device 100.

Figure 13:
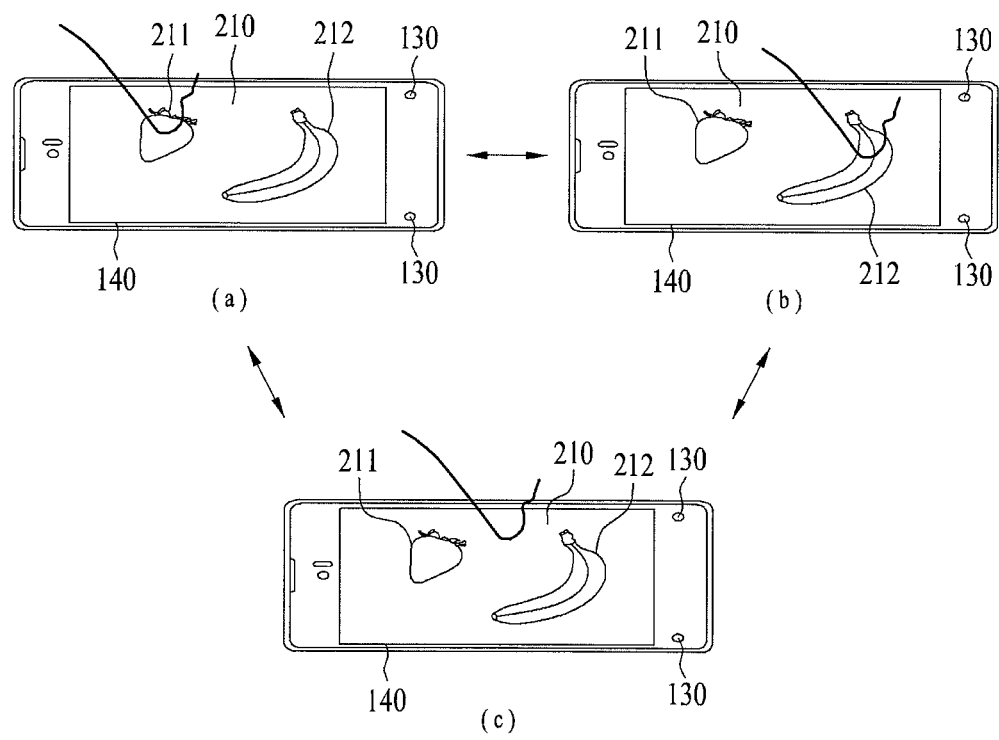
FIGS. 13 to 15 are diagrams illustrating a neutralization material emitted from a scent emitting unit when an image displayed on a display unit is not changed in a digital device according to one embodiment of the present invention.
Figure 14:
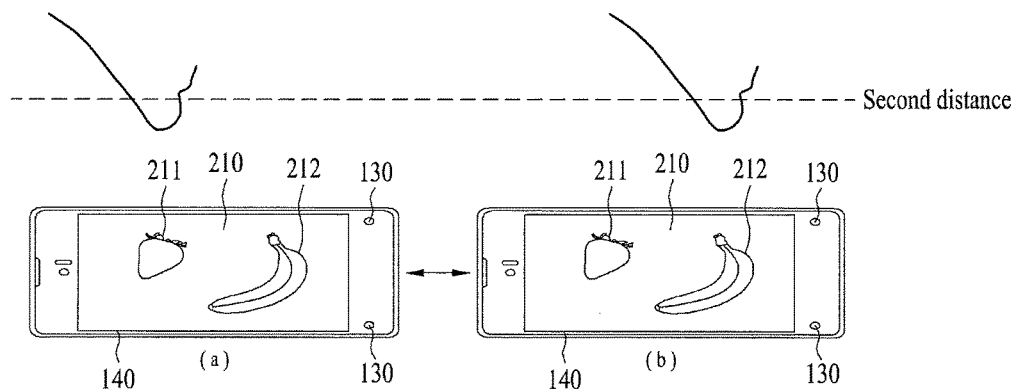
Figure 15:
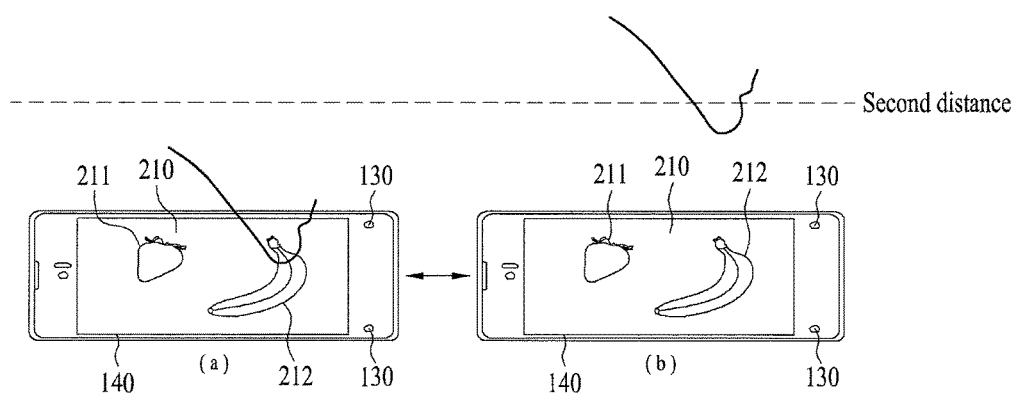

FIGS. 13 to 15 are diagrams illustrating a neutralization material emitted from a scent emitting unit when an image displayed on a display unit is not changed in a digital device according to one embodiment of the present invention.

The display unit 140 of the digital device 100 displays the first image 210 having the first object 211 having the first scent property and the second object 212 having the second scent property.

The processor 150 may control the scent emitting unit 130 to emit the neutralization material for neutralizing the previous scent before the changed scent is emitted when the scent emitted from the scent emitting unit 130 is changed from the first scent to the second scent ((a)→(b) of FIG. 13), is changed from the second scent to the first scent ((b)→(a) of FIG. 13), is changed from the first scent or the second scent to the mixture of the first scent and the second scent ((a)→(c) of FIG. 13, (b)→(c) of FIG. 13 or (a)→(b) of FIG. 15)), is changed from the mixture of the first scent and the second scent to the first scent or the second scent ((c)→(a) of FIG. 13, (c)→(b) of FIG. 13 or (b)→(a) of FIG. 15)) or is changed from the mixture having a first mixture ratio to the mixture having a second mixture ratio ((a)⇋(b) of FIG. 14).

According to the present invention, the digital device 100 may control a scent emitting direction according to influence of external wind. This will be described with reference to FIGS. 16 and 17.

Figure 16:
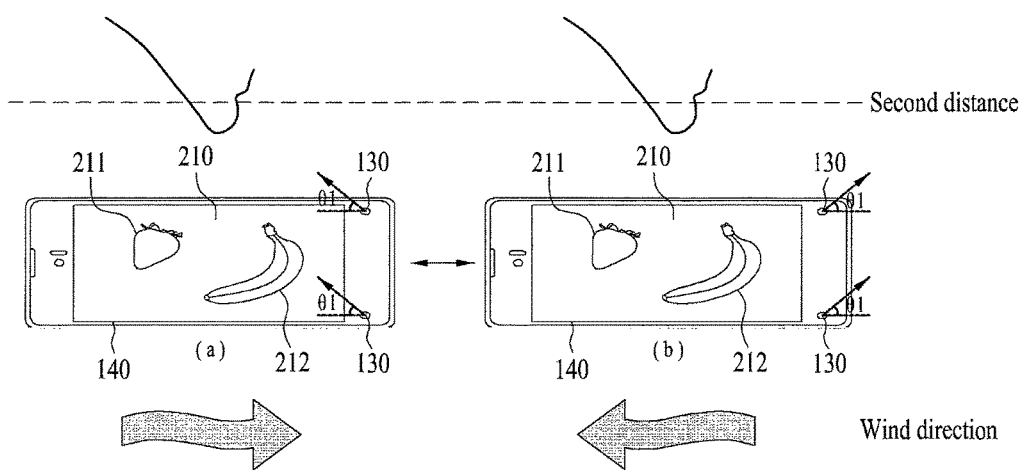
FIGS. 16 and 17 are diagrams illustrating a scent emitting unit for emitting a scent to an external wind direction in a digital device according to one embodiment of the present invention.
Figure 17:
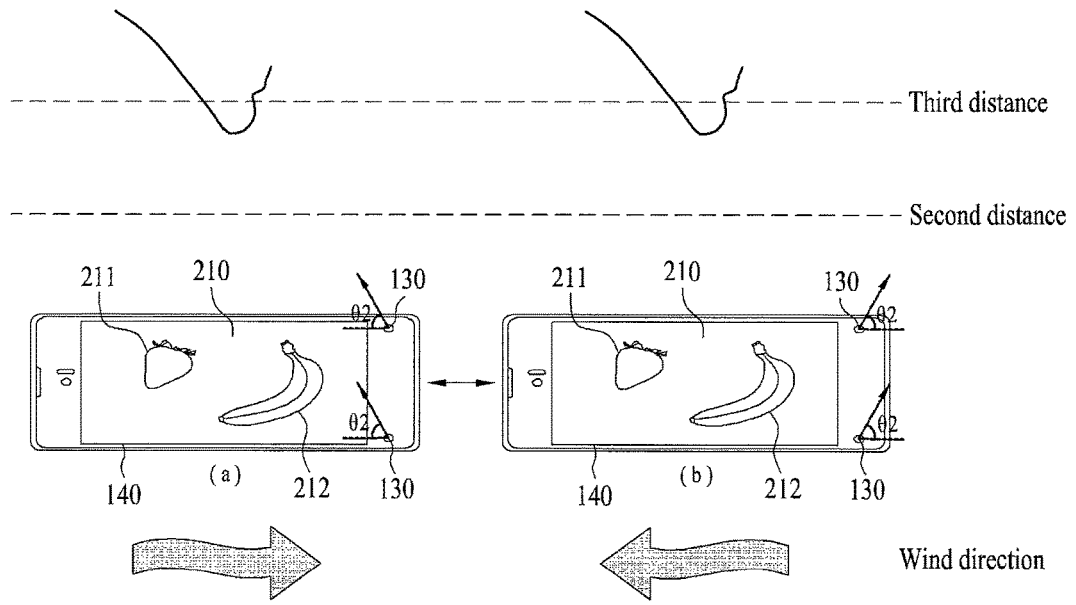

FIGS. 16 and 17 are diagrams illustrating a scent emitting unit for emitting a scent to an external wind direction in a digital device according to one embodiment of the present invention.

Referring to FIGS. 16 and 17, the display unit 140 of the digital device 100 displays the first image 210 having the first object 211 having the first scent property and the second object 212 having the second scent property.

The sensor unit 110 further senses an external wind direction. The processor 150 may control the scent emitting unit 130 to emit the scent to the direction of the wind, based on the wind direction sensed by the sensor unit 110.

For example, if the external wind is north wind, the processor 150 controls the scent emitting unit 130 to emit the scent to north. The sensor unit 110 may not accurately detect whether the external wind is north wind but may roughly sense the windward.

According to the embodiment, the processor 150 may control the scent emitting unit 130 to emit the scent, the strength of which is changed according to the distance from the specific body part of the user, windward. The strength of the scent may mean the concentration of the material configuring the scent and/or the spay pressure of the scent. For example, the processor 150 may control the scent emitting unit 130 to emit the scent, the strength of which is relatively larger in FIG. 17 in which the distance from the specific body part of the user is greater than the distance from the specific body part of the user of FIG. 16.

According to the embodiment, the processor 150 may control the scent emitting unit 130 to emit the scent, the spray angle of which is changed according to the distance from the specific body part of the user, in the wind direction. For example, the processor 150 may control the scent emitting unit 130 to emit the scent, the spray angle of which is relatively larger in FIG. 17 in which the distance from the specific body part of the user is greater than the distance from the specific body part of the user of FIG. 16.

Figure 18:
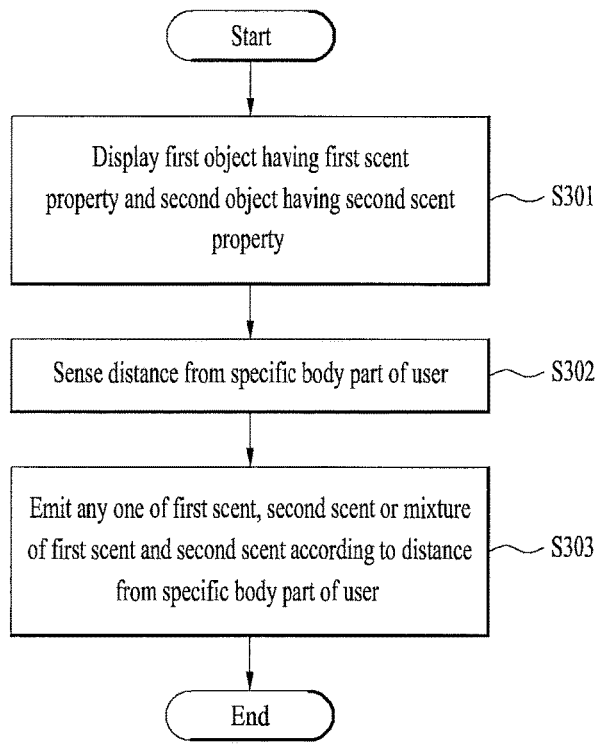
FIG. 18 is a flowchart illustrating a method for controlling a digital device for emitting a scent according to one embodiment of the present invention.

FIG. 18 is a flowchart illustrating a method for controlling a digital device for emitting a scent according to one embodiment of the present invention.

The display unit 140 displays the first image 210 having the first object 211 having the first scent property and the second object 212 having the second scent property (S301).

The sensor unit 110 senses the distance from the specific body part of the user (S302).

The processor 150 controls the scent emitting unit 130 to emit at least one of the first scent, the second scent or the mixture of the first scent and the second scent according to the distance from the specific body part of the user sensed by the sensor unit 110 (S303).

The cases in which the distance from the specific body part of the user as the sensed result of the sensor unit 110 is equal to or less than the first distance, is greater than the first distance and is equal to or less than the second distance, is greater than the second distance and is equal to or less than the third distance or is greater than the third distance have been described with reference to FIGS. 3 to 11. The case in which the scent emitting unit 130 emits the scent according to influence of external wind has been described with reference to FIGS. 16 and 17. The case in which the neutralization material is emitted when the kind or component of the scent emitted from the scent emitting unit 130 is changed has been described with reference to FIGS. 12 to 15.

According to the digital device of one embodiment of the present invention, it is possible to emit a scent, the strength of which is changed according to user's intention. Accordingly, since the user simply approaches an object to be smelled in natural fashion, it is possible to increase user convenience.

According to the digital device of one embodiment of the present invention, it is possible to emit the scent to the windward.

Although the embodiments are described with respect to the respective figures for convenience of description, the embodiments shown in the respective figures may be combined to implement a new embodiment. A computer-readable recording medium having a program recorded thereon for executing the above-described embodiments is included in the scope of the present specification.

The digital device and the method for controlling the same according to one embodiment of the present invention may be implemented as other embodiments by combining the above-described drawings or matters well known to those skilled in the art.

The method of controlling the digital device according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

What is claimed is:

1. A digital device comprising:
a display configured to display a first image including a first object having a first scent property and a second object having a second scent property;
a sensor configured to sense at least one of a distance from a specific body part of a user to the sensor or an external wind direction;
a scent emitter configured to emit a scent corresponding to an image; and
a processor,
wherein the processor is configured to control the scent emitter to emit any one of a first scent, a second scent or a mixture of the first scent and the second scent,
wherein a mixture ratio of the first scent to the second scent in the mixture is changed according to a predetermined condition, and
wherein the processor is further configured to:
control the scent emitter to emit at least one scent of an object corresponding to the specific body part of the user when the sensed distance from the specific body part of the user is equal to or less than a first distance, and
control the scent emitter to emit the mixture in which a rate of a scent of an object closer to the specific body part of the user is larger than a rate of a scent of the other object in the mixture, when the sensed distance from the specific body part of the user is equal to or less than a second distance and greater than the first distance.

2. The digital device according to claim 1, wherein the processor further controls the scent emitter to emit the mixture, in which the mixture ratio of the first scent to the second scent is 1:1, when the sensed distance from the specific body part of the user is equal to or less than a third distance and greater than the second distance.

3. The digital device according to claim 2, wherein the processor further controls the scent emitter to stop scent emission when the sensed distance from the specific body part of the user exceeds the third distance.

4. The digital device according to claim 3, wherein the processor further controls the scent emitter to emit any one of the first scent, the second scent, or the mixture of the first scent and the second scent, when a predetermined user input is detected only.

5. The digital device according to claim 1, wherein:
the display includes a touchscreen, and
the processor controls the scent emitter to emit a scent of an object corresponding to a touch area of the touchscreen between the first scent and the second scent when touch input is received via the touchscreen.

6. The digital device according to claim 5, wherein the processor further controls the scent emitter to emit the scent of the object corresponding to the touch area of the touchscreen regardless of the sensed distance from the specific body part of the user when touch input is received via the touchscreen.

7. The digital device according to claim 1, wherein at least one of the first object and the second object has a depth perceived by the user.

8. The digital device according to claim 7, wherein the processor determines an object closer to the specific body part of the user using the sensed distance from the specific body part of the user and the depth.

9. The digital device according to claim 1, wherein the processor further controls a strength of the scent emitted from the scent emitter according to the distance from the specific body part of the user.

10. The digital device according to claim 4, further comprising a user input interface configured to receive user input from a user, wherein the processor is further configured to control the scent emitter to emit at least one of the first scent, the second scent or the mixture of the first scent and the second scent according to specific user input received via the user input interface when the sensed distance from the specific body part of the user exceeds the third distance.

11. The digital device according to claim 1, wherein the first image includes a still image or a moving image.

12. The digital device according to claim 1, wherein:
the display displays a second image instead of the first image, and
the processor controls the scent emitter to stop emission of the first scent, the second scent or the mixture of the first scent and the second scent and to emit a neutralization material.

13. The digital device according to claim 1, wherein the processor further controls the scent emitter to emit a neutralization material before emitting the second scent or the mixture when the scent emitted from the scent emitting unit is changed from the first scent to the second scent or is changed from the first scent to the mixture.

14. The digital device according to claim 1, wherein, when the scent emitted from the scent emitter is changed from a mixture having a first mixing ratio to a mixture having a second mixing ratio, the processor controls the scent emitter to emit a neutralization material before emitting the mixture having the second mixing ratio.

15. The digital device according to claim 1, wherein the processor controls the scent emitter to emit the scent to the wind direction when the sensed distance from the specific body part of the user exceeds the first distance.

16. The digital device according to claim 15, wherein the processor further controls the scent emitter to emit the scent, a strength of which is changed according to the sensed distance from the specific body part of the user, toward the direction of the wind.

17. A method for controlling at least one digital device, the method comprising:
displaying a first image including a first object having a first scent property and a second object having a second scent property;
sensing at least one of a distance from a specific body part of a user to a sensor in the at least one digital device or an external wind direction;
emitting any one of a first scent, a second scent or a mixture of the first scent and the second scent;
emitting at least one scent of an object corresponding to the specific body part of the user when the sensed distance from the specific body part of the user is equal to or less than a first distance; and
emitting the mixture in which a rate of a scent of an object closer to the specific body part of the user is larger than a rate of a scent of the other object in the mixture, when the sensed distance from the specific body part of the user is equal to or less than a second distance and greater than the first distance, wherein a mixing ratio of the first scent to the second scent in the mixture is changed according to a predetermined condition.

\* \* \* \* \*